United States Patent
Schick et al.

(10) Patent No.: US 6,605,800 B1
(45) Date of Patent: Aug. 12, 2003

(54) REGULATING DEVICE FOR A WELDING APPARATUS

(75) Inventors: Roland Schick, Sattledt (AT); Franz Niedereder, Fischlham (AT); Andreas Burgstaller, Eberstalzell (AT); Michael Brunner, Seiersberg (AT)

(73) Assignee: Fronius Schweissmaschinen Produktion GmbH & Co. KG, Pettenbach (AT)

( * ) Notice: Subject to any disclaimer, the term of this patent is extended or adjusted under 35 U.S.C. 154(b) by 0 days.

(21) Appl. No.: 09/807,551
(22) PCT Filed: Oct. 11, 1999
(86) PCT No.: PCT/AT99/00242
§ 371 (c)(1), (2), (4) Date: Apr. 13, 2001
(87) PCT Pub. No.: WO00/23223
PCT Pub. Date: Apr. 27, 2000

(30) Foreign Application Priority Data

Oct. 16, 1998 (AT) .......................... A 1735/98

(51) Int. Cl.$^7$ .............................. B23K 9/10
(52) U.S. Cl. .................. 219/130.5; 219/125.1
(58) Field of Search ............. 219/130.5, 124.34, 219/125.1, 125.11, 125.12, 130.33; 901/42

(56) References Cited

U.S. PATENT DOCUMENTS

| | | | | |
|---|---|---|---|---|
| 4,521,672 A | * | 6/1985 | Fronius | ............... 219/130.33 |
| 4,959,523 A | * | 9/1990 | Fihey et al. | ........... 219/124.34 |
| 4,973,814 A | | 11/1990 | Kojima et al. | |
| 5,059,765 A | * | 10/1991 | Laing | ............. 219/130.5 |
| 5,708,253 A | | 1/1998 | Bloch et al. | |
| 5,808,885 A | | 9/1998 | Dew et al. | |
| 6,297,472 B1 | * | 10/2001 | Bong et al. | ........... 219/125.12 |

FOREIGN PATENT DOCUMENTS

| | | |
|---|---|---|
| DE | 4412534 | 3/1995 |
| EP | 0354388 | 7/1989 |
| EP | 0463489 | 6/1991 |
| EP | 0737538 | 10/1996 |
| EP | 0907118 | 4/1999 |

* cited by examiner

*Primary Examiner*—Clifford C. Shaw
(74) *Attorney, Agent, or Firm*—Collard & Roe, P.C.

(57) ABSTRACT

The invention describes a control device for a welding device (1), consisting of a digital control device (4), in particular a microprocessor control, and a welding process control unit, comprising a signal processing unit, hereinafter referred to as SP unit, and a pulse width modulator, hereinafter referred to as PWM, and at least one external component, such as a power component (3) or an input and/or output device (22), etc., for example. The welding process control is digitally operated by the welding process control unit and the configuration and parameter settings for the welding process control unit are handled by the control device (4) through software means.

18 Claims, 2 Drawing Sheets ns in order to exchange data, which means that whenever one of the external components is exchanged or replaced, the control unit needed for the control procedure also has to be replaced.

REGULATING DEVICE FOR A WELDING APPARATUS

CROSS REFERENCE TO RELATED APPLICATIONS

Applicants claim priority under 35 U.S.C. §119 of Austrian Application No. A 1735/98, filed: Oct. 16, 1998. Applicants also claim priority under 35 U.S.C. §120 of PCT/AT99/00242, filed: Oct. 11, 1999. The international application under PCT article 21(2) was not published in English.

The invention relates to a welding device of the type outlined.

A method and a device for controlling a welding machine are known from EP 0 907 118 A2, in which the control device sends data across a bus system to an interface, this data being converted by the interface according to the connected components.

Also known from U.S. Pat. No. 4,973,814 A is a control device for a resistance welder, in which the process is controlled by analogue and the data is digitally processed internally, the analogue data picked up being converted by an analogue-to-digital converter in preparation for the internal processing. The internal data is re-converted for controlling the process by means of a digital-to-analogue converter.

A welding device is known from EP 0 463 489 A2, which runs a digital data exchange with external components by means of a field bus. However, it is not clear how the welding device controls and regulates the welding process.

U.S. Pat. No. 5,808,885 A discloses a welding control system, in which the individual components, in particular the power component (weld power module and welder), are again connected by individual digital and analogue lines.

Also known from EP 0 737 538 A1 is a terminal unit for a resistance welding process, in which the terminal unit is digitally connected to the machine. A machine code (machine ID) is detected by the terminal unit, after which the corresponding programmes can be loaded. However, individual components of the machine can only be exchanged if an identical component is used because the component is not recognised, which means any additional options of a different component can not be used.

Control systems for welding devices are already known, in which data is exchanged via a host, in particular a micro-controller, having control units connected by lines, such as a signal-processing unit referred hereinafter as SP unit, a pulse width modulator, hereinafter referred to as PWM, etc. The control units are also connected via lines to external components, such as a power component, and input and/or output device, etc. The individual desired values required for the welding process are determined or computed by means of an appropriate software programme, the desired values being converted into an analogue signal, in particular a voltage, by a digital-to-analogue converter, so that they can be processed by the control units. The individual control units adapt the actual values from the external components to generate the predetermined desired values. Furthermore, the actual values are converted into a digital signal by an analogue-to-digital converter and forwarded to the host so that the latter can apply an appropriate adjustment to the individual control signals and/or desired values. The disadvantage of this system is that the individual control units have to be adapted to the individual external compo- The underlying objective of the present invention is to provide a control system for a welding device and a method of controlling a welding device, in which the process regulation or control of the external components is operated on a purely digital basis.

This objective is achieved by the features outlined. The advantage of this system is that standard components can be used to build a welding device of this type, in particular the common assembly, thereby ensuring safe operation and enabling a compact structure to be achieved. Another advantage is that only simple software changes are needed in order to adapt to the most varied of operating conditions for special applications or adapt to upgraded components of the welding device, without having to make changes in the hardware. Also of advantage is the fact that, because the common unit is digitally controlled, existing welding devices which have a common assembly can be easily retrofitted and adapted to new upgraded components, the software merely having to be adapted in order to use the upgraded components.

Other advantageous embodiments are described. The resultant advantages can be found in the detailed description of the drawing.

The invention also relates to a method of controlling a welding device, as outlined.

Independently of the above, the objective of the invention is achieved by a method of controlling a welding device as a result of the features specified. The advantage is that because data is exchanged digitally between the individual components, the welding process can be controlled or regulated rapidly, which significantly improves the welding quality.

Other advantageous features are described. The resultant advantages can be found in the detailed description of the drawings.

The invention will be described in more detail below, with reference to embodiments illustrated as examples in the drawings.

Of these:

Figure 1:
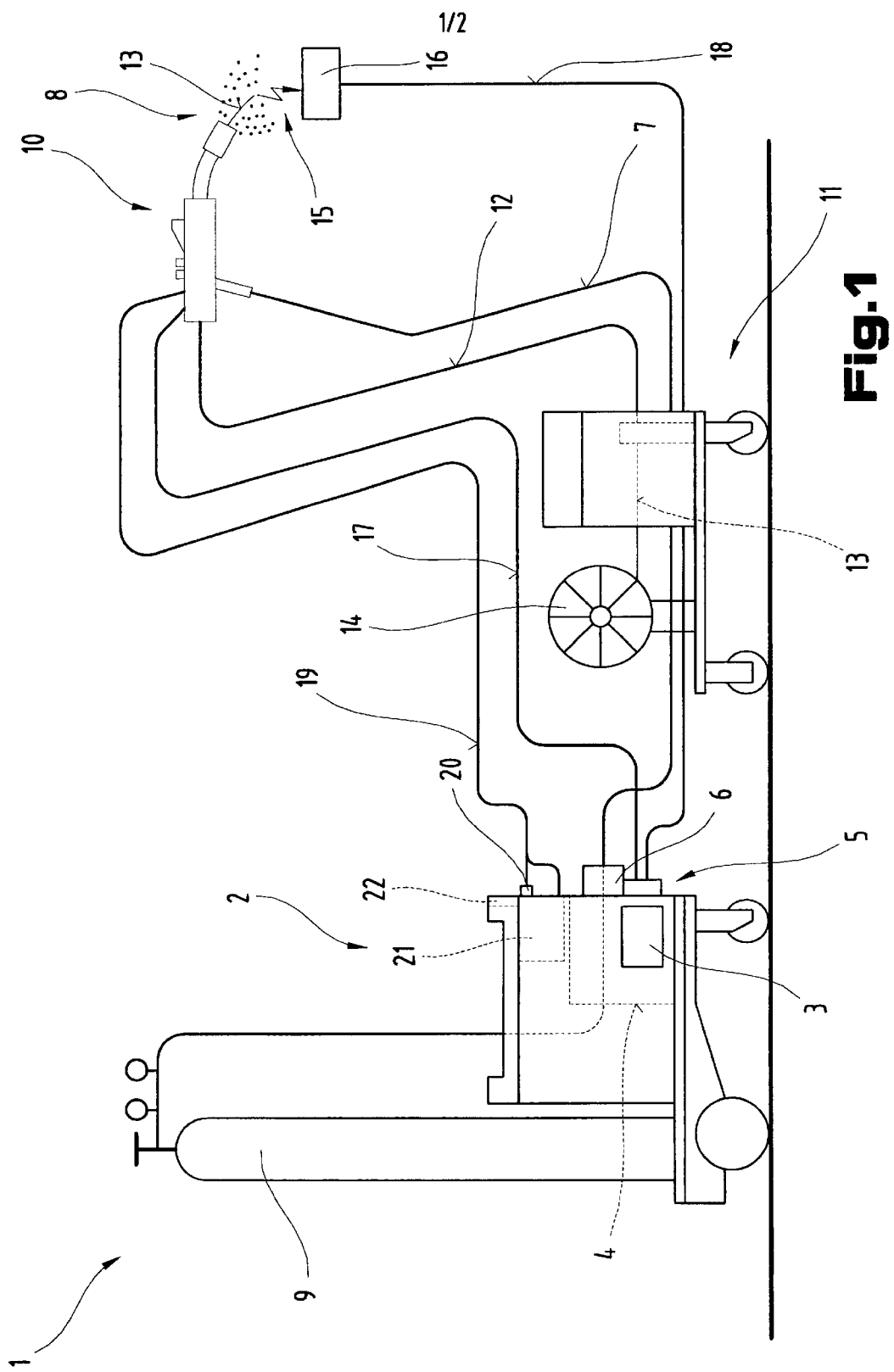
FIG. 1 is a simplified diagram, schematically illustrating the structure of the welding device.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates a welding device 1 for performing a whole range of welding processes, e.g. MIG/MAG welding or TIG-welding.

The welding device 1 has a power source 2 with a power component 3, a control device 4 and a switching unit 5 co-operating with the power component 3 or the control device 4. The switching unit 5 or the control device 4 is connected to a control valve 6, which co-operates with a delivery line 7 for a gas 8, in particular an inert gas, such as $CO_2$, helium or argon and similar, running between a gas storage 9 and a welding torch 10.

A wire feed device 11 of the standard type used in MIG/MAG welding, for example, may also be activated via the control device 4, so that a welding wire 13 is fed from a supply drum 14 to the region of the welding torch 10 via a delivery line 12. The current needed to strike an arc 15 between the welding wire 13 and a workpiece 16 is fed via a supply line 17 from the power component 3 of the power source 2 to the welding torch 10 or welding wire 13, the workpiece 16 to be welded also being connected to the welding device 1 via another supply line 18 so that a circuit can be set up by means of the arc 15.

In order to cool the welding torch 10, a water container 21 may be connected to the welding torch 10 via a coolant circuit 19, having a flow indicator 20 connected in between, and when the welding torch 10 is switched on, the coolant circuit 19 is activated by the control device 4, thereby cooling the welding torch 10 or the welding wire 13.

The welding device 1 also has an input and/or output device 22, by means of which a whole range of welding parameters or operation types of the welding device 1 can be set. The welding parameters set in the input and/or output device 22 are forwarded to the control device 4, from where the individual components of the welding device 1 are activated.

Clearly, instead of connecting the welding torch 10 to the individual components, in particular the welding device 1 or wire feed device 11, by individual lines as in the embodiment illustrated as an example here, it would also be possible to incorporate these individual lines in a common hose pack which is then connected to the welding torch 10.

Figure 2:
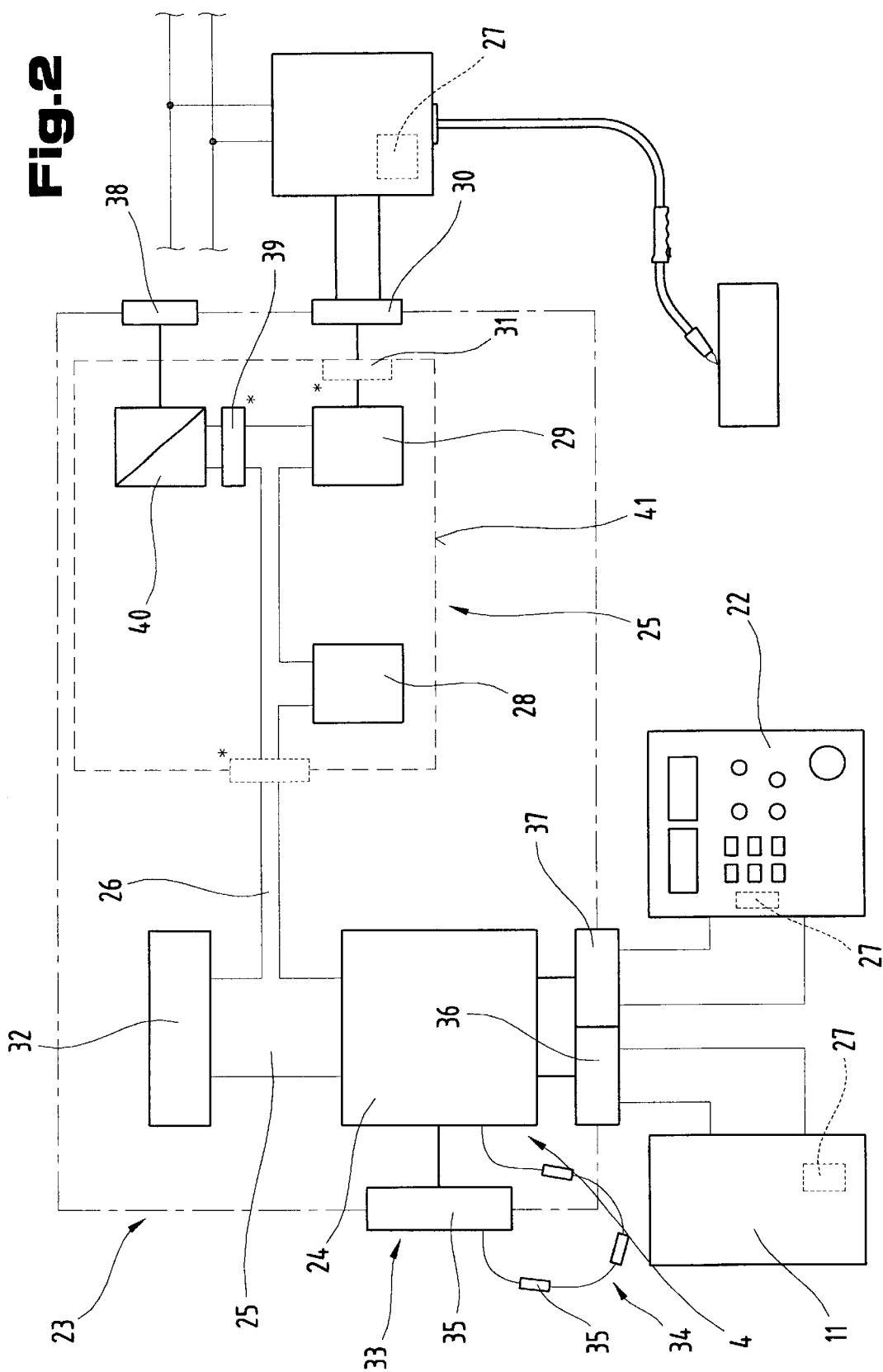
FIG. 2 is a simplified, schematic diagram of the control system for a welding device as proposed by the invention.

FIG. 2 is a block diagram of a control unit 23 for a welding device 1, as proposed by the invention.

To this end, the control unit 23 for the welding device 1 incorporates the control device 4 in the form of a microprocessor control 24 or a micro-controller. A welding process control unit 25 is also provided in the control unit 23. The welding process control unit 25 is set up so that only digital signals can be processed, as a result of which every variable to be controlled, in particular every welding parameter, has to be applied to the welding process control unit 25 in digital form. The welding process control unit 25, in particular its components, are connected to the control device 4, in particular the microprocessor control 24, via a standard data/address bus 26, a fictitious interface 27 indicated by broken lines being established between the control device 4, in particular the microprocessor control 24, and the welding process control unit 25. The individual components of the welding process control unit 25 may consist of a digital signal processing unit 28, hereinafter referred to as SP unit 28, and a digital pulse width modulator 29, hereinafter referred to as PWM 29. To this end, the two components, namely the SP unit 28 and the PWM 29, may be designed as a common module.

The outputs of the PWM 29 lead to an interface 30 of the control unit 23, another fictitious interface 31 being established between the welding process control unit 25 and the control unit 23. The power component 3 is connected to the PWM 29 via the interface 28 of the control unit 23.

In principle, it may be said that the interface 30 forms a connection point to the external components of the power component 3, data, in particular the control signal generated, being transferred from the interface 30 to the power component 3 in digital form, in particular by means of a data protocol, i.e. the power component 3, provided in the form of a known inverting current source, must be able to detect the transferred data protocol and then controls the power component 3 depending on the transferred data. To this end, the data of the data protocol may be evaluated by appropriate modules, after which the data is converted into an analogue signal. By setting the power component 3 up in this way, what is known as an interface card may be used to convert the digital data of the data protocol into an analogue signal. The advantage of this is that all analogue power components 3 known from the prior art can be used simply by fitting them with this interface card. Clearly, the power component 3 could also be digitally controlled, in which case there would be no need for an interface card of this type. However, a power component 3 of this type would have to be capable of detecting the transferred data protocol.

The data transfer between the individual components of the control unit 23, in particular the microprocessor control 24, the SP unit 28 and the PWM 29, as well as the other components is also operated using an appropriate data protocol. This being the case, the internal data protocol, in other words the transfer of data that does not involve an external component, may be of a different structure from the external data protocol, in other words the data transfer with an external component, for example the power component 3. However, it is of advantage if the internal data protocol is the same as the external protocol, since this simplifies the development of upgraded components, obviating the need to convert from one data protocol to another data protocol.

To enable the control device 4, in particular the microprocessor control 24, to exchange data with the SP unit 28, a memory device 32 is connected to the control device 4 via the internal data/address bus 26, in which all the operating software and control programmes needed to operate the microprocessor control 24 or welding device 1 are stored, so that when the welding device 1 is switched on, the requisite programmes can be loaded into the main memory of the microprocessor and the welding device 1 configured, in a manner known in the field of microprocessor controls 24, in particular microprocessors or personal computers.

In order to connect the other individual external components, such as the input and/or output device 22, the wire feed device 11, the coolant circuit 19, etc., needed to run the welding device 1 to the control unit 23, the control unit 23 has an interface 33. In the embodiment illustrated as an example here, this interface 33 is connected directly to the inputs and/or outputs of the microprocessor control 24 and is preferably provided as an interface 33 of a type known from the prior art, for example an RS 232. This interface 33 is configured as a ring bus 34, as indicated by broken lines, enabling several components to be connected and activated via an interface connector 35 to the ring bus 34. Accordingly, at least one or more external components may now be connected to the ring bus 34 so that an integrated structure of the welding device 1 with the central control unit 23 can be set up, i.e. the user can set the individual welding parameters, such as the welding current rating, the welding voltage, the welding wire diameter, for a whole range of welding parameters from the input and/or output device 22 and these are transferred from the input and/or output device 22 across the interface 33 to the control unit 23, in particular the microprocessor control 24. Individual data sets are in turn transferred from the external components by means of an appropriate data protocol and the individual external components may in turn be fitted with an interface card.

Clearly, the microprocessor control 24 is able to run a control procedure with an external component via the interface 33, in particular via the ring bus 34, i.e. for example the microprocessor control 24 can send the wire feed rate to the wire feed device 11. To this end, during a welding process using the welding device 1, a constant data exchange can be operated via this ring bus 34 from the microprocessor control 24, for example in order to apply desired or actual values of or for the individual components.

Other, specially configured interfaces 36, 37 may also be provided at the microprocessor control 24, for example for specially configured external components, such as a special wire feed device 11 and/or a special input and/or output device 22. These other interfaces 36, 37 may be connected directly to inputs and/or outputs of the microprocessor 24, in particular the microprocessor, so that data can in turn be exchanged between them. Clearly, it would also be possible to provide several interfaces 36, 37 of this type for other external components although these have been left out of the embodiment illustrated as an example here for the sake of clarity. It should be pointed out that, for the sake of clarity, other components or structural elements for operating the control unit 23, in particular the microprocessor control 24, such as a crystal etc., and for exchanging data between the control unit 23 and the external components such as an interface driver etc., are not illustrated.

Another interface 38 is provided as a means of regulating and/or controlling a welding process via the control unit 23 or the welding process control unit 25. The actual values detected or supplied by the welding torch 10, in particular the current actual value, the voltage actual value, etc., are transferred via this interface 38 to the control unit 23, in particular the welding process control unit 25. To this end, the actual values from the individual actual value-detection devices may be forwarded to the interface 38 in analogue form, as is the case in the embodiment illustrated as an example here. The supplied actual values are stored in the data/address bus 26 by the interface 38 so that the welding process control unit 25, in particular the SP unit 28 and the PWM 29, can apply an appropriate control during a welding process. By feeding the actual values into the data/address bus 26, a fictitious interface 39 is in turn set up in the welding process control unit 25, again indicated by broken lines. By configuring the data/address bus 26 in this manner, the actual values may be applied to the control device 4, in particular the microprocessor control 24, in parallel with the welding process control unit 25.

In the embodiment illustrated as an example here, the actual values are transferred to the interface 38 in analogue form, which means that these analogue actual values have to be converted into digital form. To this end, an analogue-to-digital converter 40 is provided between the interface 38 and the fictitious interface 39 of the data/address bus 26. The digital-to-analogue converter 40 then converts the applied actual values to digital actual values, after which the digital actual value is forwarded in the form of the internal data protocol so that the individual components of the welding process control unit 25 and the control device 4 are able to process this data. Clearly, rather than integrating the analogue-to-digital converter 40 in the welding process control unit 25, it would also be possible for the analogue-to-digital converter 40 to be arranged directly in the external components, in particular the welding torch 10, in which case the analogue actual value is converted externally to the control unit 23.

However, if the analogue-to-digital converter 40 is disposed in the control unit 23, in particular in the welding process control unit 25, the individual components of the welding process control unit 25, namely the SP unit 28, the PWM 29 and the analogue-to-digital converter 40, may be provided as separate elements or as a single structural element.

As may be seen from the block diagram, the individual components of the welding process control unit 25 form a common assembly 41. This being the case, the microprocessor control 24 may also be integrated in this common assembly 41. This common assembly 41 is indicated by broken lines. It should be pointed out that the control device 4, in particular the microprocessor control 24, and the SP unit 28 and the PWM 29 are connected to one another by means of a data bus, in particular by the internal data/address bus 26, enabling a purely digital data transfer. Clearly, the other components, such as the memory device 32, the interface 33, the individual interfaces 30, 36 to 39, the analogue-to-digital converter 40 etc., form independent or associated assemblies and are arranged externally to this common assembly 41 within the welding device 1, these assemblies then being connected to the common assembly 41 of the control unit 23 by means of data lines. In the embodiment illustrated as an example here, however, these components are integrated in the common assembly 41 of the microprocessor control 24, the SP unit 28 and the PWM 29.

By configuring the control unit 23 in the form of the common assembly 41, different types of welding devices 1 can be set up but with every control unit 23 operating through this common assembly 41, which means that the welding device 1 can be built very cost-effectively using the same control unit 23 for the different welding devices 1. The individual external components of the welding device 1, such as the wire feed device 11, the input and/or output device 22, the power component 3, etc., are connected to the common assembly 41, in particular the control unit 23 via the interface 33 or the individual interfaces 30, 36 to 39, so that a welding device 1 of this type can be set up in a modular structure, i.e. the common assembly 41, in particular the control unit 23, is used to set up each welding device 1, to which a whole range of embodiments of external components can be connected.

In order to be able to configure welding devices 1 in this manner, it is necessary to provide different control programmes, stored in the form of software in the memory device 32, for the different types of external components. Detection of the different individual types of external components and the allocation of the individual control programmes can be operated automatically, i.e. for example, every external component may have its own detection module 42, so that corresponding data is transferred when the external component is connected to the control unit 23, enabling the microprocessor control 24 to determine which type of external component has been connected to the common assembly 41, in particular the control unit 23. Accordingly, different power components 3 may be used for the different types of welding devices 1, for example, so that welding devices 1 with different power ratings, in particular current rating, for example 150 A, 200 A or 300 A etc., can be produced or set up or integrated, and when the corresponding data is sent by the detection module 42 the microprocessor control 24 can recognise this type of power component 3 and the microprocessor control 24 can load or access the corresponding control programmes, in particular the requisite software, from the memory device 32.

Another advantage of this modular structure of the welding device 1 is that the customer is able to select the individual external components required, such as the power component 3, the input and/or output device 22, the wire feed device 11, the coolant circuit 19, etc., and can do so without production having to be specifically tailored to the customer, i.e. the customer will select an input and/or output device 22 from a whole range and simultaneously advise the manufacturer that the desired welding device 1 should have a current rating of 200 A, for example, so that when the welding device 1 is built, a corresponding power component 3 is connected to the interface 30 and the selected input and/or output device 22 to the interface 33. Clearly, the customer is free to choose any external component from a corresponding product range. When the welding device 1 is switched on, the individual components connected to the various interfaces 30, 36 to 39 and the interface 33 are scanned and detected by the control device 4, in particular the microprocessor control 24, so that the corresponding control programmes, in particular the software, is loaded from the memory device 32 and a customer-defined welding process run without any further adjustments. Accordingly, the integrated or co-operating software can be stored in a single memory region of the memory device 32 so that the configuration and parameter settings for the welding device 1 need be set up only once.

As a result of the welding device 1 proposed by the invention, the welding process control of the welding process control unit 25, in particular the common assembly 41, is digitally operated and the configuration and parameter setting of the welding process control unit 25 can be handled through software, in particular by means of the control programmes. To this end, the first time or whenever the welding device 1 is switched on, the microprocessor control 24 sends the requisite software to the welding process control unit 25, in particular the SP unit 28 and the PWM 29, so that the power component 3 can be activated and controlled. The corresponding desired values are then determined or computed by the microprocessor control 24 and sent to the SP unit 28 so that the welding process control unit 25, in particular the SP unit 28 and the PWM 29, can run a comparison with the detected actual values, thereby generating a corresponding control signal which is applied to the power component 3 in digital form via the interface 30.

Because the common assembly 41 is provided as a digital embodiment, all control processes or regulation processes can now be forwarded in digital format by means of a data protocol, eliminating losses that would otherwise be incurred by translating or converting a digital signal into an analogue signal, as is the case with welding devices known from the prior art and operated by microprocessors, since the individual components of these welding devices, such as the SP unit and the PWM, are analogue and thus require the digital signal to be converted by the microprocessor.

With the welding device 1 proposed by the invention, all control procedures and regulation procedures are operated in digital form with a standardised data protocol so that even if using different external components, such as different power components 3, different input and/or output devices 22 or different wire feed devices 11, they will all be able to detect the data protocol enabling different components to be used at any time. In order to be able to use a digital system of this type with a welding device 1, any external components used which are controlled by analogue must incorporate appropriate assemblies for converting the individual digital control signals to analogue signals, i.e. for example analogue-to-digital and/or digital-to-analogue converters must be provided in the power component 3 or in the input and/or output device 22 so that data can be exchanged with the common assembly 41, in particular the control unit 23. To this end, if analogue components are used, a converter unit, which may be in the form of an interface card, must be provided between them and the common assembly 41, in other words at the interfaces 30, 36 to 39 and the interface 33, where all the assemblies needed for exchanging data between the common assembly 41 and the analogue components are disposed. By setting up the external components in this manner or providing the converter unit, all existing analogue components can be advantageously connected to the common assembly 41, obviating the need to upgrade all the existing components.

Clearly, it would also be possible for all external components to be fully digitised, i.e. switching devices such as used in the power component 3 with an inverting current source may also be digitally activated. In this case, it is of advantage if individual driver stages are provided directly in the external components for activating assemblies of this type since the driver stages can be easily adapted to the required power rating when updating the components.

With the welding device 1 proposed by the invention, the individual components disposed in the common assembly 41 may be selected from the most varied of known digital systems, such as the microprocessor control 24, the digital signal processing unit 28 and the digital pulse width modulator 29, but the individual components must be capable of running a data exchange via a commonly configured data protocol. With the welding device 1, in particular the common assembly 41 or the control unit 23, data is exchanged internally and with the external components by means of digital signals only, i.e. different conducting voltages are no longer present.

In this embodiment, only the detected actual values are applied as analogue to the interface 38, where these analogue signals are converted into digital form by means of the analogue-to-digital converter 40 so that the SP unit 28 can run a comparison between the digitised actual values and the predetermined digital desired values. If the actual values are at variance with the desired values, the SP unit 28 will then generate a corresponding digital output signal which is forwarded across the internal data/address bus 26 to the PWM 29. The digital PWM 29 converts the predetermined output signal into a corresponding digital signal comprehensible to the power component 3 so that the power component 3 can be activated via the interface 30 and a regulation applied, for example the current rating or the voltage rating, etc., by means of the power component 3.

As mentioned above, the power component 3 may be provided as an inverting current source so that an appropriate activation procedure can be used of the type known from the prior art. The microprocessor control 24 is solely responsible for computing and determining the individual desired values whilst regulation or control is handled directly by the SP unit 28 and the PWM 29 if the actual values are at variance with the desired value. The advantage of a system of this type is that the welding process can be controlled or regulated independently, so that when a change is made to a setting for a predetermined welding parameter of the microprocessor, the desired values that will then be applied to the SP unit 28 and the PWM 29 can be simultaneously re-computed, thereby obviating the need to interrupt the welding process.

Because the welding process is independently controlled or regulated by the microprocessor 24, it will be possible to achieve 100% reproducibility of a welding process since the microprocessor control 24 is able to store the incoming actual values, which are simultaneously transferred from the analogue-to-digital converter 40 to the microprocessor control 24, the SP unit 28 and the PWM 29, in a predefined memory region of the memory device 32, but at the same time as the SP unit 28 and the PWM 29 are controlling or regulating the welding process so that there is no time lost in the control or regulation process. After a welding process, the user then has the option of loading this data from the memory device 32 and evaluating whether there is any faulty welding. To this end, the user may be connected to a personal computer via the standardised interface 33, in particular via an interface connector 35, to which the common assembly 41, in particular the control unit 23, can be switched, so that the data can be loaded into an analysis programme, which will enable the user to perform all the evaluations.

With the welding device 1, the user has the option of setting different welding processes from the input and/or output device 22 and has various other options for setting a whole range of welding parameters, such as the welding wire diameter, the welding speed, the current rating etc., corresponding control signals being forwarded from the input and/or output device 22 by means of the data protocol to the interface 33, enabling the microprocessor control 24 to pick up the underlying data protocol and load the requisite software programmes or control programmes needed to run the welding process and then compute the individual desired values which are forwarded to the welding process control unit 25. To this end, individual control programmes or operating sequences may also be forwarded to the welding process control unit 25 by means of the data protocol by connecting the microprocessor control 24 in between.

The advantage of this is that the individual software programmes or control programmes can be loaded from the memory device 32 into the main memory of the microprocessor control 24 so that the individual software programmes or control programmes can be accessed rapidly as the welding process is running. If the microprocessor control 24 has worked out all the data needed for the welding process, the welding process control unit 25 can be activated via the internal data/address bus 26 in the form of a data protocol so that the user can run a corresponding welding process. Moreover, the external components, such as the wire feed device 11, can be directly activated via the interfaces 33 or the special interfaces 36, 37 by the microprocessor control 24, i.e. the latter transfers corresponding desired values and optionally a start signal to the wire feed device 11, after which it operates an automatic control depending on the predetermined desired values.

Accordingly, with a welding device 1 as proposed by the invention, all data needed to control and regulate a welding process is applied in digital form, in particular by means of a data protocol, and only the detected actual values are in analogue form and are then converted into a digital signal by means of known components, thereby producing a welding device 1 that is operated under full digital control.

The advantage of controlling the welding device 1 in this manner is that the welding device 1 can be built to a compact design because only a lower power output is needed for exchanging data between the individual components and the components used may all be of small dimensions. Furthermore, the components or structural elements used to control or build a welding device 1 of this type are known standard parts and the fact of using advanced digital components will ensure safe operation of the welding device 1.

There are many advantages to setting the welding device 1 up in a digital configuration. The control unit 23, in particular the common assembly 41, can always be used to control and regulate any added external components, which reduces the cost of building a welding device 1 of this type because, by contrast with the existing art, where all components have to be upgraded or adapted whenever a new component is added to a welding device 1, any components newly added to the welding device 1 proposed by the invention will have to use or detect whatever data protocol is used and these components can therefore be exclusively controlled through software, i.e. appropriate software for controlling or regulating the newly added components is programmed or configured and then transferred via the standardised interface 33 to the microprocessor control 24 so that it can store the newly added software programme in the memory device 32 in order to access this software programme whenever the newly added components have to be operated with the common assembly 41.

Accordingly, previously manufactured and delivered welding devices 1 can be adapted for use with a common assembly 41 of this type simply by updating the software to handle the new external components, which means that the welding device 1 can be rapidly upgraded to the latest technology. Furthermore, any faulty components can be easily replaced and the new components being used will run a new initialisation due to a detection process by the detection module 42, making the welding device 1 immediately ready for use again.

Using an analogue-to-digital converter 42 in the common assembly 41 means that several analogue inputs are available for different actual values, offering the possibility of detecting and processing a whole range of actual values, such as the current rating, the operating temperature, the output voltage of the welding torch 1 etc., since the microprocessor control 24 loads appropriate software on automatic detection of the individual components, thereby enabling the different actual values to be processed by the various software programmes. At the same time, any components known from the prior art may be used.

Moreover, because the welding device 1 is digitally controlled in a simple configuration, the welding device 1 can be maintained remotely since the user can connect the welding device 1 to a modem via the standardised interface 27 and make any adjustments needed by remotely downloading the updated software from a central location or from the manufacturer.

For the sake of good order, it should finally be pointed out that in order to provide a clearer understanding of the structure of the welding device 1, it and its constituent parts have been illustrated in diagrammatic form only.

The tasks underlying the independent inventive solutions can be found in the description. Above all, subject matter relating to the individual embodiments illustrated in FIGS. 1; 2 can be construed as independent solutions proposed by the invention. The tasks and solutions can be found in the detailed descriptions relating to these drawings.

| List of Reference Numbers | |
|---|---|
| 1 | Welding device |
| 2 | Power source |
| 3 | Power component |
| 4 | Control device |

-continued

List of Reference Numbers

| | |
|---|---|
| 5 | Switching unit |
| 6 | Control valve |
| 7 | Delivery line |
| 8 | Gas |
| 9 | Gas storage |
| 10 | Welding torch |
| 11 | Wire feed device |
| 12 | Delivery line |
| 13 | Welding wire |
| 14 | Supply drum |
| 15 | Arc |
| 16 | Workpiece |
| 17 | Supply line |
| 18 | Supply line |
| 19 | Coolant circuit |
| 20 | Flow indicator |
| 21 | Water container |
| 22 | Input and/or output device |
| 23 | Control unit |
| 24 | Microprocessor control |
| 25 | Welding process control unit |
| 26 | Data/address bus |
| 27 | Interface |
| 28 | Signal processing unit |
| 29 | Pulse width modulator |
| 30 | Interface |
| 31 | Interface |
| 32 | Storage device |
| 33 | Interface |
| 34 | Ring bus |
| 35 | Interface connector |
| 36 | Interface |
| 37 | Interface |
| 38 | Interface |
| 39 | Interface |
| 40 | Digital/analogue converter |
| 41 | Common assembly |
| 42 | Detection module |

What is claimed is:

1. A welding device comprising a central digital control unit which comprises a central microprocessor control and a welding process control unit connected by a data/address bus to form a common assembly for controlling several types of external welding process components, and the central digital control unit having several interfaces connecting the external components thereto,
   (a) the welding process control unit comprising
      (1) internal components of a signal processing unit and a pulse width modulator, and
   (b) the central microprocessor control including a memory device storing software digitally controlling the configuration and parameter settings of the external components connected by the interfaces to the central digital control unit, whereby data exchange between the external components and the central digital control unit and between the internal components is effected by digital signals so that the welding process is digitally controlled, and data transfer from the microprocessor control to the components is effected by digital data sets by a data protocol.

2. Welding device as claimed in claim 1, wherein an interface is set up between the central microprocessor control and the welding process control unit at the data/address bus.

3. Welding device as claimed in claim 2, wherein another interface is set up between the welding process control unit and said interface at the data/address bus.

4. Welding device as claimed in claim 1, wherein the output(s) of the pulse width modulator lead(s) to an interface of the control device.

5. Welding device as claimed in claim 4, wherein said interface forms a connection point to an external power component, the data being digitally applied by the interface by means of the digital data protocol.

6. Welding device as claimed in claim 1, wherein one of the external components is an inverting current source.

7. Welding device as claimed in claim 1, wherein data is transferred between the internal components, and data is transferred from the central digital control unit to the external components with the same data protocol or a different data protocol.

8. Welding device as claimed in claim 1, wherein the interface is a ring bus by means of which at least one external component is connected to the central digital control unit.

9. Welding device as claimed in claim 1, wherein the pulse width modulator comprises digital switching circuitry.

10. Welding device as claimed in claim 1, wherein an analogue-to-digital converter is arranged upstream of the common assembly, adjacent to several analogue inputs.

11. Welding device as claimed in claim 10, wherein the analogue-to-digital converter is connected to an interface at a data-address bus.

12. Welding device as claimed in claim 11, wherein the analogue-to-digital converter is disposed in the welding process control unit.

13. Welding device as claimed in claim 12, wherein an interface is set up between the analogue-to-digital converter and the signal processing unit and the pulse width modulator.

14. Welding device as claimed in claim 1, wherein several digital outputs are connected to the signal processing unit and the central digital control unit with a serial data protocol.

15. Welding device as claimed in claim 1, wherein the signal processing unit and the pulse width modulator control the welding process.

16. Welding device as claimed in claim 1, wherein the microprocessor control handles computation of the desired values and operating sequences of the welding process and the microprocessor control forwards the desired values and the operating sequences to the signal processing unit and the pulse width modulator via a data/address bus.

17. Welding device as claimed in claim 1, wherein the common assembly has a standardized interface by means of which the common assembly can be connected to another standardized interface for exchanging data.

18. Welding device as claimed in claim 1, wherein the external components include a power component, an input and output device, a wire feed device or a coolant circuit.

* * * * *